(12) United States Patent
Bellows et al.

(10) Patent No.: US 10,095,894 B1
(45) Date of Patent: Oct. 9, 2018

(54) SYSTEMS AND METHODS FOR DENSITY-BASED RFID NETWORK CONFIGURATION

(71) Applicant: SYMBOL TECHNOLOGIES, LLC, Lincolnshire, IL (US)

(72) Inventors: David Bellows, Old Westbury, NY (US); Timothy B. Austin, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/851,346

(22) Filed: Dec. 21, 2017

(51) Int. Cl.
*G06K 7/10* (2006.01)
*G06K 17/00* (2006.01)

(52) U.S. Cl.
CPC ..... *G06K 7/10227* (2013.01); *G06K 7/10297* (2013.01); *G06K 17/0029* (2013.01); *G06K 2017/0045* (2013.01); *G06K 2017/0051* (2013.01)

(58) Field of Classification Search
USPC ........................................................ 235/385
See application file for complete search history.

(56) References Cited

U.S. PATENT DOCUMENTS

2010/0277286 A1* 11/2010 Burkart .............. G06K 19/0701
340/10.34

* cited by examiner

*Primary Examiner* — Rafferty Kelly
(74) *Attorney, Agent, or Firm* — Yuri Astvatsaturov

(57) ABSTRACT

A system and method for density-based RFID network configuration. In various aspects, an RFID reader executes a read cycle defined by dwell times for a low RFID tag density and a high RFID tag density setting. Accordingly, a controller may cause the RFID reader to implement one or more RFID protocols. The controller may then receive data corresponding to the RFID tags from the RFID reader to determine a number of RFID tags within read range of the RFID reader. Based on the number of RFID tags, the controller may determine an adjustment to the read cycle executed by the RFID reader. The controller may then configure the RFID reader to execute the adjusted read cycle.

26 Claims, 4 Drawing Sheets

SYSTEMS AND METHODS FOR DENSITY-BASED RFID NETWORK CONFIGURATION

BACKGROUND OF THE INVENTION

Warehouses, retail spaces, or other venues often employ Radio Frequency Identification (RFID) technology to track various objects located therein. For example, products, packages, vehicles, people, scanners, and robots may all by tagged with an RFID tag. An RFID positioning system located in the venue may then track the location of tagged objects as the objects traverse the venue.

Common RFID standards define several different protocols at which RFID readers may operate. However, as will be described in more detail, some of these protocols are better adapted at tracking objects in environments densely populated with RFID tags; while others are better adapted at tracking objects in environments sparsely populated with RFID tags. In some scenarios, if the RFID positioning system utilizes a protocol adapted for low tag densities in a high tag density environment, the tracking system is unable to detect all of the tags in the environment. Similarly, in other scenarios, if the RFID positioning system utilizes a protocol adapted for high tag densities in a low tag density environment, the tracking data for each object may be captured less frequently causing the position data to be less accurate. Accordingly, there is a need for systems and methods for density-based RFID network configuration.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
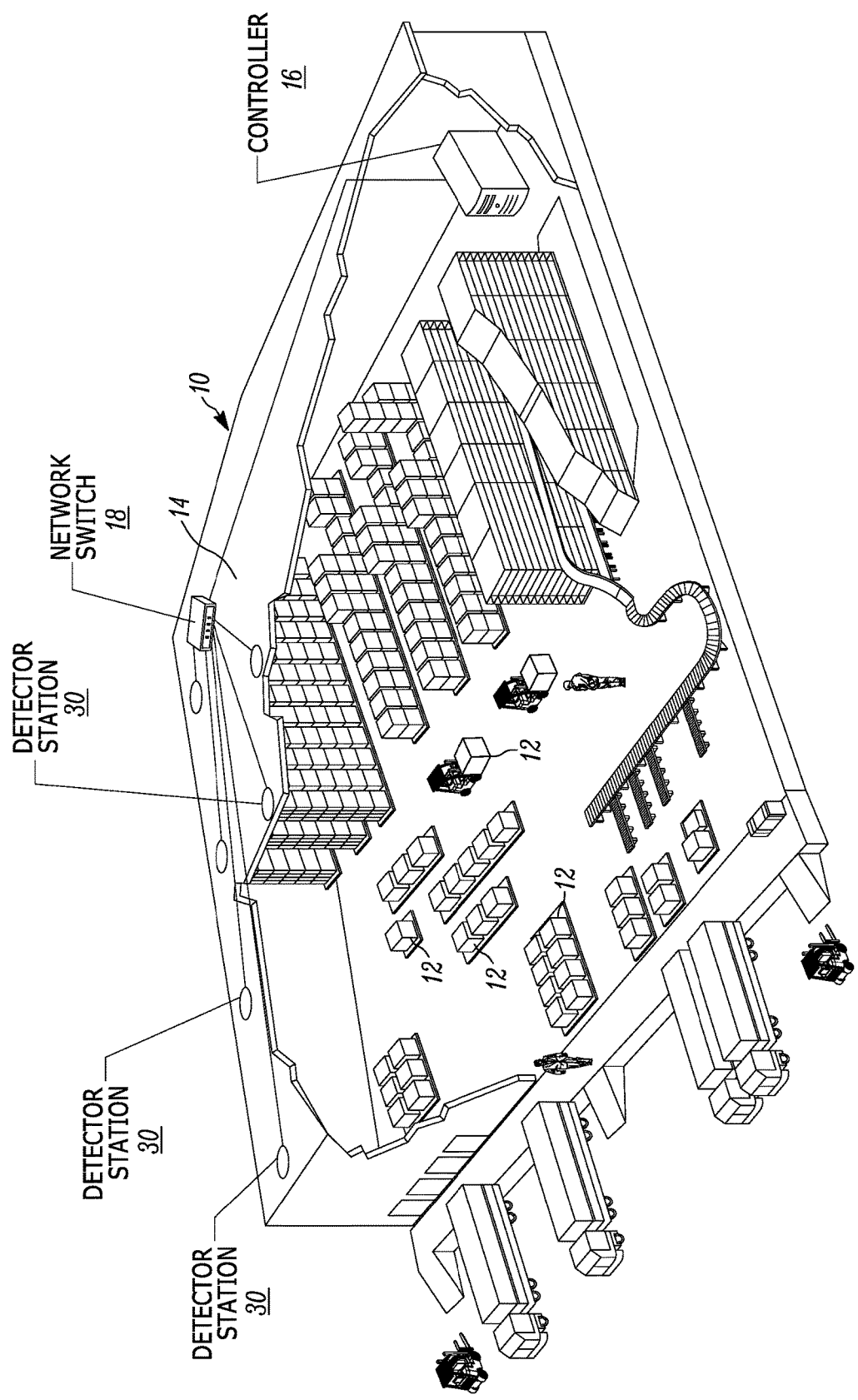
FIG. 1 is a perspective view of a venue illustrating an arrangement for which a Radio Frequency Identification (RFID) positioning system within the venue is deployed, in accordance with an example.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments of the present disclosure include methods and systems for density based RFID network configuration. The system may include a plurality of radio frequency identification (RFID) readers, such as fixed overhead RFID readers, disposed throughout a venue. Each of the RFID readers may be configured to execute a read cycle that is defined by a dwell time for a high RFID tag density setting and a dwell time for a low RFID tag density setting. Each of the RFID readers may also be configured to implement one or more of the following RFID protocols, wherein each protocol (i) is associated with a first state and a second state, (ii) when an RFID tag responds to a query generated by the RFID reader, the RFID tag alternates between the first and second states, and (iii) RFID tags respond when a state of the queried RFID tag matches a state of the RFID reader: a first protocol where queried RFID tags in the matching state change to the other state for a duration of a timeout period and return to the matching state upon expiration of the timeout period; and a second protocol and a third protocol wherein RFID tags in the matching state change to the other state until (1) queried by an RFID reader in the other state, or (2) when the matching state is the second state, the queried RFID tag loses RF power for a threshold duration. The system may also include a controller operatively connected to the plurality of RFID readers. The controller includes at least one computer processor configured to receive, from the plurality of RFID readers, data corresponding to a plurality of RFID tags, and to determine, based on the data corresponding to the plurality of RFID tags, a number of RFID tags within a read range of each RFID reader. The controller may also be configured to determine, based on the number of RFID tags within the read range of each RFID reader, an adjustment to the read cycle for the RFID reader, and to configure each RFID reader to execute the adjusted read cycle.

In some embodiments, an RFID positioning system includes a plurality of RFID readers that track the position of a plurality of RFID tags. To track the position of the RFID tags, the RFID readers broadcasts a query message. In response, the RFID tags may transmit a response to the RFID reader. Based on characteristics of the response, the RFID positioning system is able to determine the position of the responding RFID tags within a monitored environment.

A centralized controller may control operation of the RFID readers. To this end, an RFID reader may execute a read cycle in which the RFID reader queries RFID tags within its RF footprint (i.e., the read range). The read cycle may be defined by how long the query is transmitted and how long the RFID reader awaits responses and/or process the responses. Said another way, the read cycle may be defined by a dwell time for different modes of operation. To this end, the read cycle may include an indication of a sequence of modes of operation and the dwell time the RFID reader should spend in each mode of operation included in the sequence. The RFID reader may then continuously execute the read cycle to track the position of the RIFD tags within the RFID reader's RF footprint.

In various embodiments, RFID positioning systems implement standards that define a communication scheme between RFID readers and RFID tags. Several of these standards include settings to adapt a network to a high-density environment or to a low-density environment. Accordingly, RFID readers within an RFID positioning system may execute a read cycle defined by a dwell time for which the RFID reader implements the high-density settings and/or a dwell time for which the RFID reader implements the low-density settings. Based on the measured RFID tag density, a controller may adjust at least one of the dwell times (including setting the dwell time to zero). By adjusting the dwell times based on the RFID tag density, the controller ensures that the RFID positioning network adapts to environmental conditions to increase the number of RFID tags capable of being tracked and the frequency at which the position of those RFID tags is determined.

Common RFID standards, such as EPC™ Radio-Frequency Identity Protocols Generation-2 UHF RFID Version 2.0.0 and ISO/IEC 18000-6, include two RFID states, referred to as State A and State B. The state may be implemented at an RFID reader or an RFID tag by setting a flag value. For example, the RFID reader may include an indication of the flag in broadcasted queries and RFID tags may include a memory location at which an indication of the flag is stored. RFID tags may analyze a broadcasted query to detect the state of the RFID reader. If the state of the RFID tag matches the state of the RFID reader, the RFID tag responds to the query.

According to the common standards, when an RFID tag responds to a query from an RFID reader set in the same state as the tag for the given session, the RFID tag alternates states. That is, RFID tags in State A switch to State B upon responding to a query, and RFID tags in State B switch to State A upon responding to a query. Additionally, in embodiments in which passive RFID tags are implemented, if an RFID tag in State B loses RF power for a threshold duration (such as 5 seconds, 10 seconds, etc.), the RFID tag may be reset to State A.

In addition to the two states, the common RFID standards also define four different protocols that may be implemented by RFID positioning systems. A first protocol, referred to as Session 0, causes RFID tags to always respond to a query by an RFID reader. In a second protocol, referred to as Session 1, when an RFID tag responds to a query, the RFID tag initiates a wait timer (typically under 5 seconds). In embodiments described herein, when the wait timer expires, the RFID tag will toggle back to its original state. For example, if a Session/State 1A RFID tag responds to a query by a Session/State 1A reader, the RFID tag will switch to Session/State 1B during the wait time. Thus, the RFID tag will not respond to any additional queries by the Session/State 1A reader. Once the wait timer expires, the RFID tag switches back to Session/State 1A. Accordingly, the RFID tag will respond to a subsequent query from a Session/State 1A RFID reader.

The common RFID standards also define two complementary protocols, referred to as Session 2 and Session 3. In Session 2 and Session 3, when an RFID tag responds to a query from an RFID reader set in the same state as the RFID tag for that session, the RFID tag will flip to the other state and stay there until the RFID tag responds to a query by an RFID reader in the other state for that session or, if the RFID tag flipped to State B, until the RFID tag loses RF power for a threshold duration. Generally, for the RFID tag to be able to detect a query from an RFID reader in the other state for the same session, the RFID tag must be transported to be within the RF footprint of another RFID reader. That is, generally, an RFID tag affixed to a stationary object will not respond to subsequent Session 2 or Session 3 queries (so long as it receives RF power). Accordingly, to increase the frequency at which mobile RFID tags respond to queries, RFID positioning systems that implement Session 2 and/or Session 3 typically configure RFID readers to form an alternating pattern (e.g., a checkerboard pattern) of Session/State 2A and Session/State 2B readers or Session/State 3A and Session/State 3B readers, respectively.

In some scenarios, there are too many RFID tags in the RF footprint of an RFID reader for the RFID reader to process all the query responses fast enough. In these scenarios, not every RFID tag will be read, and, as a result, the objects with which these unread RFID tags are associated will not be properly tracked. Said another way, in these scenarios, the RFID reader's read rate cannot keep up with the volume of RFID tags within its read range, thereby causing the RFID positioning system to be unable to determine the location for all the RFID tags in its vicinity.

Accordingly, in high-density environments, embodiments disclosed herein tend to implement Session 2 and/or Session 3. Thus, generally stationary objects will be quieted and not respond to subsequent queries by the same RFID reader. This reduces the number of responses detected by the RFID reader such that the RFID reader is more likely to be able to process all of the received responses. Thus, in some scenarios, the RFID reader's read rate is able to accommodate this reduced number of tags that respond.

It should be noted that if there is no change in an object's position, then having its associated RFID tag quieted down thereby gives preference for the RFID reader to process mobile RFID tags that have entered its RF footprint. Accordingly, when implementing Session 2 and/or Session 3, mobile objects only respond to a subsequent query when entering the RF footprint of an adjacent RFID reader that matches the RFID tag's Session/State. Thus, as the read rate for the RFID reader is not a limiting factor in low-density environments, embodiments disclosed herein generally implement Session 1 to increase the number of times RFID tags within the RF footprint of the RFID reader are read, thereby increasing the frequency at which the position of objects are tracked. Said another way, with fewer RFID tags responding to a query, there is less need to quiet any of the RFID tags down as the RFID tag population is at a smaller, more manageable level. Thus, the RFID reader may be able to read each RFID tag multiple times.

Although the above sets forth how common RFID standards may be utilized to implement settings adapted for a high RFID tag density environment and a low RFID tag density environment, it is envisioned that other standards, including future-developed standards, may be utilized to implement the disclosed density-based RFID network configuration techniques. Accordingly, the techniques disclosed herein may be applied to any RFID standard that sets forth particular standards and/or protocols for use in high RFID tag density and low RFID tag density environments.

In some embodiments, to determine the RFID tag density in an RFID positioning network, a controller may count the number or unique RFID tags within the RF footprint (i.e., the read range) of each RFID reader. However, as described above, there are scenarios in which the RFID reader is unable to detect and/or process each response to the query. In these scenarios, the determined count is lower than the actual number of RFID tags. Accordingly, various embodiments described herein implement one or more techniques to ensure that the count represents the actual number of RFID tags within an RFID reader's RF footprint, and not an artificial limit imposed by processing limitations.

In a first technique, the RFID positioning network may execute an inventory round to determine the number of RFID tags within the network's RF footprint. To execute the inventory round, the controller may configure each RFID reader to execute a read cycle where each of the low-density dwell time and the high-density dwell time are sufficiently long so as to ensure that each RFID tag can be analyzed. Accordingly, embodiments described herein may count the number of unique tags detected by each RFID reader during the inventory cycle to determine the dwell times for the read cycle during normal operation. In some scenarios, the inventory cycle is executed overnight or during down time to avoid disrupting tracking during operating hours.

In another technique, a capacity check cycle is executed by slightly increasing a RIFD reader's dwell time for either the low-density setting or the high-density setting. If the number of unique tags detected by the RFID reader executing the capacity check cycle increases beyond a threshold amount, it may be indicative that the RFID reader is hitting an artificial limit. Accordingly, in some embodiments, a controller may adjust the read cycle for the RFID reader to increase the dwell time of the high-density setting during and/or decrease the dwell time of the low-density setting in subsequent read cycles.

As yet another technique, the number of unique tags detected by adjacent RFID readers may also be indicative of whether an RFID reader is hitting artificial limit. To this end, if the number of unique RFID tags detected by an adjacent RFID reader exceeds the number of unique RFID tags detected by an RFID reader, then it may be indicative that the RFID reader is unable to process the number of responses to a query. Accordingly, the controller may cause the RFID reader to execute a capacity check cycle, increase the high-density dwell time, and/or decrease the low-density dwell time for a subsequent read cycle executed by the RFID reader.

By detecting whether each RFID reader is able to determine an accurate count of RFID tags within its RF footprint or if the RFID reader is hitting an artificial limit, the disclosed density-based RFID network configuration techniques may be more accurately implemented. As a result, more objects may be tracked at higher accuracies than conventionally possible.

On the other hand, in embodiments described herein, an example controller may determine whether the count for a particular RFID reader is below a threshold value. To this end, if the count is sufficiently low, then the particular RFID reader may increase the dwell time for the low-density setting and/or decrease the dwell time for the high-density setting and still process all responses to a query.

FIG. 1 is a perspective view of a venue 10 illustrating an arrangement for which an RFID positioning system 14 within the venue 10 is deployed. Although the example venue 10 is illustrated as a warehouse, the disclosed embodiments may be implemented at other types of venues (such as a retail store, an airport, a stadium, a performance center, and so on). In the example embodiment of FIG. 1, RFID tags 12 are associated with various objects within the venue 10. For example, the RFID tags 12 may be affixed to packages, products or other items disposed in the venue 10, embedded in devices carried or worn by venue occupants, included in communication units affixed to vehicles and/or robots that traverse the venue, and so on.

The example RFID positioning system 14 includes a plurality of detector stations 30 positioned throughout the venue 10. While FIG. 1 illustrates the detector stations 30 in a grid pattern, the particular dimensions of alternate venues 10 may necessitate other arrangements of detector stations 30. The detector stations 30 may include RFID readers configured to communicate with the RFID tags 12. In some embodiments, the detector stations 30 may include other sensing devices, such as an image sensor or a ultra wideband (UWB) sensor.

In the illustrated example, the venue 10 also includes a centralized controller 16, such as a networked host computer or server. The example centralized controller 16 may be configured to determine and/or adjust the read cycles executed by the RFID readers within the detector stations 30. Accordingly, the example centralized controller 16 is connected to the plurality of detector stations 30 positioned throughout the venue 10 via a network switch 18. To this end, each of the detector stations 30 may be in either wired or wireless electronic communication with centralized controller 16 via the network switch 18. For example, in some embodiments, the detector stations 30 may be connected via Category 5 or 6 cables and use the Ethernet standard for wired communications. In other embodiments, the detector stations 30 may be connected wirelessly, using built-in wireless transceivers, and may use the IEEE 802.11 (WiFi) and/or Bluetooth standards for wireless communications. Other embodiments may include detector stations 30 that use a combination of wired and wireless communication.

Furthermore, each of the detector stations 30 may be individually addressable. Accordingly, the centralized controller 16 may individually configure the RFID reader of each detector station 30. For example, some locations within the venue 10 may have a higher RFID tag density than other locations within the venue 10. Thus, the centralized controller 16 may configure a detector station 30 that services the denser portion of the venue 10 to execute a read cycle that has a longer dwell time for a high-density setting. Similarly, the centralized controller 16 may configure a detector station 30 that services the less dense portion of the venue 10 to execute a read cycle that has a longer dwell time for a low-density setting.

In some embodiments, to set the initial dwell times for a read cycle executed by a detector station 30, prior knowledge of the venue 10 may be utilized. For example, if the venue 10 is a grocery store, the low-density dwell time for a detector station 30 fixed above the produce section may be relatively high as produce is not typically tagged. On the other hand, the high-density dwell time for a detector station 30 fixed above a loading dock may be relatively high. In other embodiments, the detector station 30 is configured to execute an inventory cycle to determine the initial dwell times for the read cycle.

Figure 2:
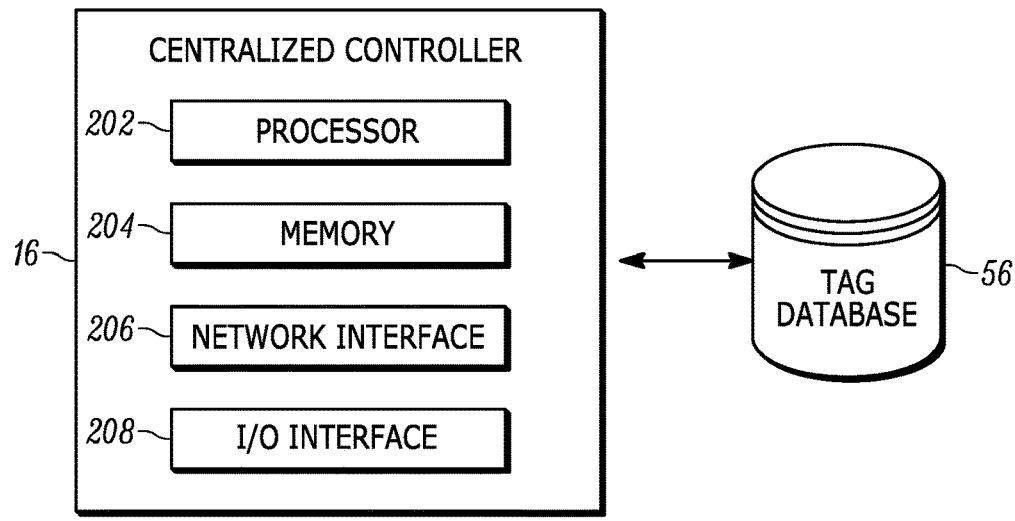
FIG. 2 is a block diagram representative of an embodiment of a centralized controller of FIG. 1, in accordance with an example embodiment.

FIG. 2 is a block diagram representative of an embodiment of centralized controller 16 of FIG. 1. The centralized controller 16 is configured to execute computer instructions to perform operations associated with the systems and methods as described herein, for example, implement the example operations represented by the block diagrams or flowcharts of the drawings accompanying this description. The centralized controller 16 may implement enterprise service software that may include, for example, Restful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. As described below, the centralized controller 16 may be specifically configured for performing operations represented by the block diagrams or flowcharts of the drawings described herein.

The example centralized controller 16 of FIG. 2 includes a processor 202, such as, for example, one or more microprocessors, controllers, and/or any suitable type of processor. The example centralized controller 16 of FIG. 2 further includes memory (e.g., volatile memory or non-volatile memory) 204 accessible by the processor 202, for example, via a memory controller (not shown). The example processor 202 interacts with the memory 204 to obtain, for example, machine-readable instructions stored in the memory 204 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the centralized controller 16 to provide access to the machine-readable instructions stored thereon.

The example centralized controller 16 of FIG. 2 may further include a network interface 206 to enable communication with other machines via, for example, one or more computer networks, such as a local area network (LAN) or a wide area network (WAN), e.g., the Internet. The example network interface 206 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example centralized controller 16 of FIG. 2 includes input/output (I/O) interfaces 208 to enable receipt of user input and communication of output data to the user, which may include, for example, any number of keyboards, mice, USB drives, optical drives, screens, touchscreens, etc.

The example centralized controller 16 of FIG. 2 is operatively connected to a tag database 56 that stores information associated with a plurality of RFID tags 12 detected by an RFID positioning network 14 at the venue 10. A stored record for a particular RFID tag 12 may include an identifier of the RFID tag 12, a latest location for the RFID tag 12, an identifier of the RFID reader in communication with the RFID tag 12, a set of historical locations for the RFID tag 12, state(s) and/or session(s) for the RFID tag 12, and so on. Additionally, the tag database 56 may store information about a plurality of RFID readers included in detector stations 30. For example, a stored record for a particular RFID reader may include an identifier of the RFID reader, an identifier of each RFID tag 12 within the RF footprint of the RFID reader, a location of the RFID reader, information that defines a read cycle for the RFID reader, and so on. It will be appreciated that although FIG. 2 illustrates the tag database 56 as being external to the example centralized controller 16, other example centralized controllers 16 may internally include the tag database 56.

Figure 3:
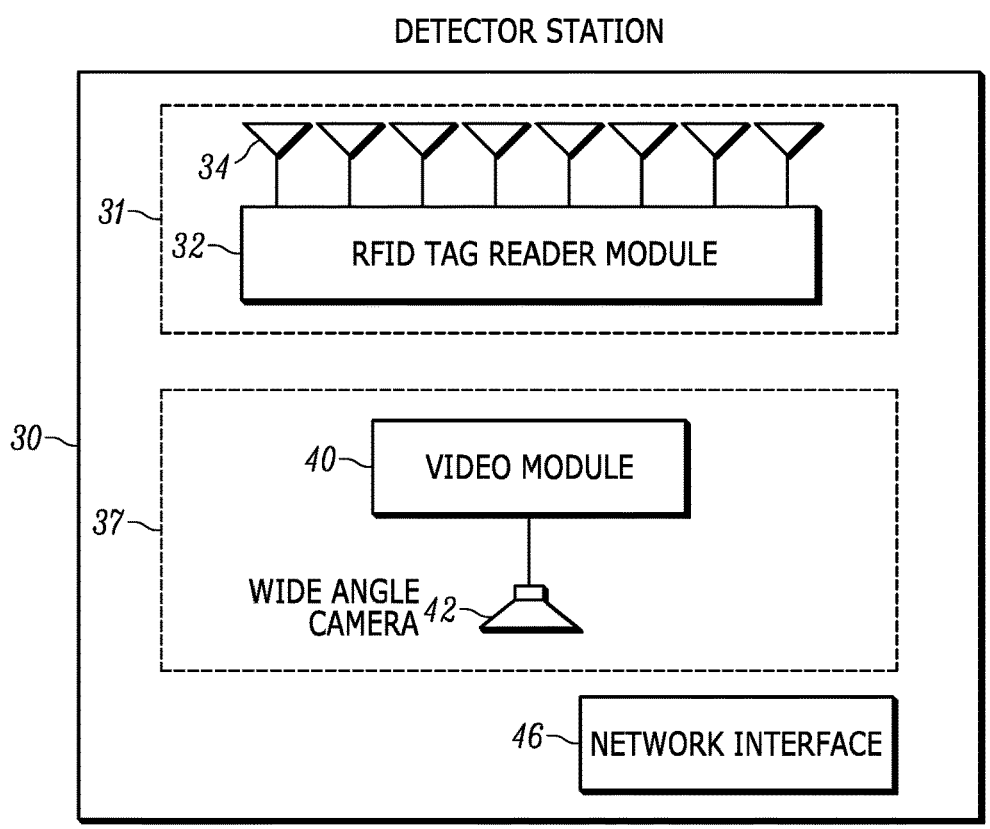
FIG. 3 is a block diagram illustrating an example implementation of a detector station, as may be used in the venue of FIG. 1, in accordance with an example embodiment.

FIG. 3 is a block diagram illustrating an example implementation of an embodiment of a detector station 30. In the illustrated example, the detector station 30 includes two example detectors 31 and 37, as further described herein. For example, a detector in the form of an RFID reader 31 is operative for reading the RFID tags 12 affixed to and/or embedded in objects within the venue 10.

More particularly, as shown in FIG. 3, each RFID reader 31 includes an RFID tag reader module 32 that has a controller, a memory, and an RF transceiver, which are operatively connected to a plurality of RFID antenna elements 34, which are energized by the RFID module 32 to radiate RF energy (also referred to herein as a beam) over an antenna beam pattern. As those of skill will recognize, an antenna and its beam pattern may be characterized by the antenna's beam width (i.e., the antenna's half power beam width). The RFID reader 31 is operated, under the control of the RFID module 32, to transmit RF beam or wave energy to the RFID tags 12, and to receive RF response signals from the RFID tags 12, thereby interrogating and processing the payloads of the RFID tags that are in read range of the RF transceiver. The RFID read range for a detector station 30 may be a 360° zone defined by the RFID antenna elements 34 and their collective beam patterns. In various embodiments, a detector station 30 may include eight RFID antenna elements 34, each maintained in a fixed position and each having a beam pattern extending in a different direction. During operation, the RF transceiver may capture RFID tag information that identifies RFID tags 12 disposed in the venue 10. The centralized controller 16 may be configured to control the overhead RFID readers 31 in the plurality of detector stations 30 to read the RFID tags 12 affixed to and/or embedded in objects within the venue 10.

The RFID antenna elements 34 determine a signal strength for the data received from the RFID tags 12. The comparative signal strengths at the each RFID antenna element 34 of a particular detector 30 are used to determine the location (i.e., position) and/or direction of travel of the RFID tag 12, using a suitable locationing/positioning technique, such as triangulation, trilateration, multilateration, etc. Such locationing and direction of travel may be determined by analyzing data from multiple detector stations 30 and centralized controller 16. The example centralized controller 16 stores the determined location of the RFID tags 12 in the RFID tag database 56.

The example detector station 30 is configured to cause the RFID reader 31 to execute a read cycle. In some embodiments, the read cycle is defined by an indication of one or more modes of operation for the RFID reader 31 and a dwell time the RFID reader 31 spends in each mode of operation. To this end, the RFID module 32 may include local storage that stores the indications of the modes of operation and the respective dwell times. As described herein, the detector station 30 may be configured to receive updates to the read cycle from the centralized controller 16. Accordingly, upon detecting an update from the centralized controller 16, the detector station 30 may update the locally stored indications of the read cycle at the RFID module 32.

In embodiments in which the RFID tags 12 include a passive RFID tag, the RFID tag 12 may be energized by the RF beam emitted from the detector stations 30. Accordingly, in these embodiments, the RIFD tag 12 does not need to include a power source to transmit RFID tag information back to the detector stations 30. As a result, the RIFD tags 12 may be manufactured at a sufficiently low cost to make it economical for the RFID tags 12 to be affixed to or embedded in a large number of objects at the venue 10. Additionally, the lack of a power source also enables the RFID tags 12 to be used over a longer period of time as there is no depletable power source. That said, the RFID tags 12 may still include active RFID tags that have their own power source to enable higher transmit powers that facilitate more accurate position determination.

In the illustrated example of FIG. 3, the detector station 30 may further include a video detector 37 operative for detecting or locating a target by capturing image data indicative of a target in the venue 10, such as a group member moving through venue 10. More particularly, the video detector 37 may be mounted in each detector station 30 and may include a video module 40 having a camera controller that is connected to a camera 42, which may be, for example, a wide-angle field of view camera for capturing the image of a target. In some embodiments, the camera 42 may be a high-bandwidth video camera, such as a moving picture expert group (MPEG) compression camera. In some embodiments, the camera may include wide-angle capabilities such that camera 42 would be able to capture images over a large area to produce a video stream of the images. As referred to herein, the image capture devices or video cameras (also referred to as image sensors herein) are configured to capture image data representative of the venue or an environment of the venue. Further, the image sensors described herein are example data capture devices, and example methods and apparatuses disclosed herein are applicable to any suitable type of data capture device(s). In various embodiments, the images or data from the images may be time-stamped and synchronized or fused with other data, such as RFID data, and used to further describe, via data, the venue 10 or environment of the venue 10. Such synchronized or fused data may be used, for example, by the centralized controller 16 to verify the accuracy of the count and/or ensure proper operation of the RFID positioning system.

Any of the detector stations 30, including alone, together, or some combination thereof, may transmit electronic information, including any RFID, image, or other information, to the centralized controller 16 for processing. For example, the central controller 16 of FIG. 1 may include a network communication interface 206 communicatively coupled to network communication interfaces 46 of the detector stations 30 to receive sensing detector data, such as RFID information, and image data, such as a video stream from the wide-angle camera 42. The detector stations 30 may also receive information, commands, or execution instructions, including requests to provide additional sensory or detection information from the centralized controller 16 in order to perform the features and functionally as described herein.

Figure 4:
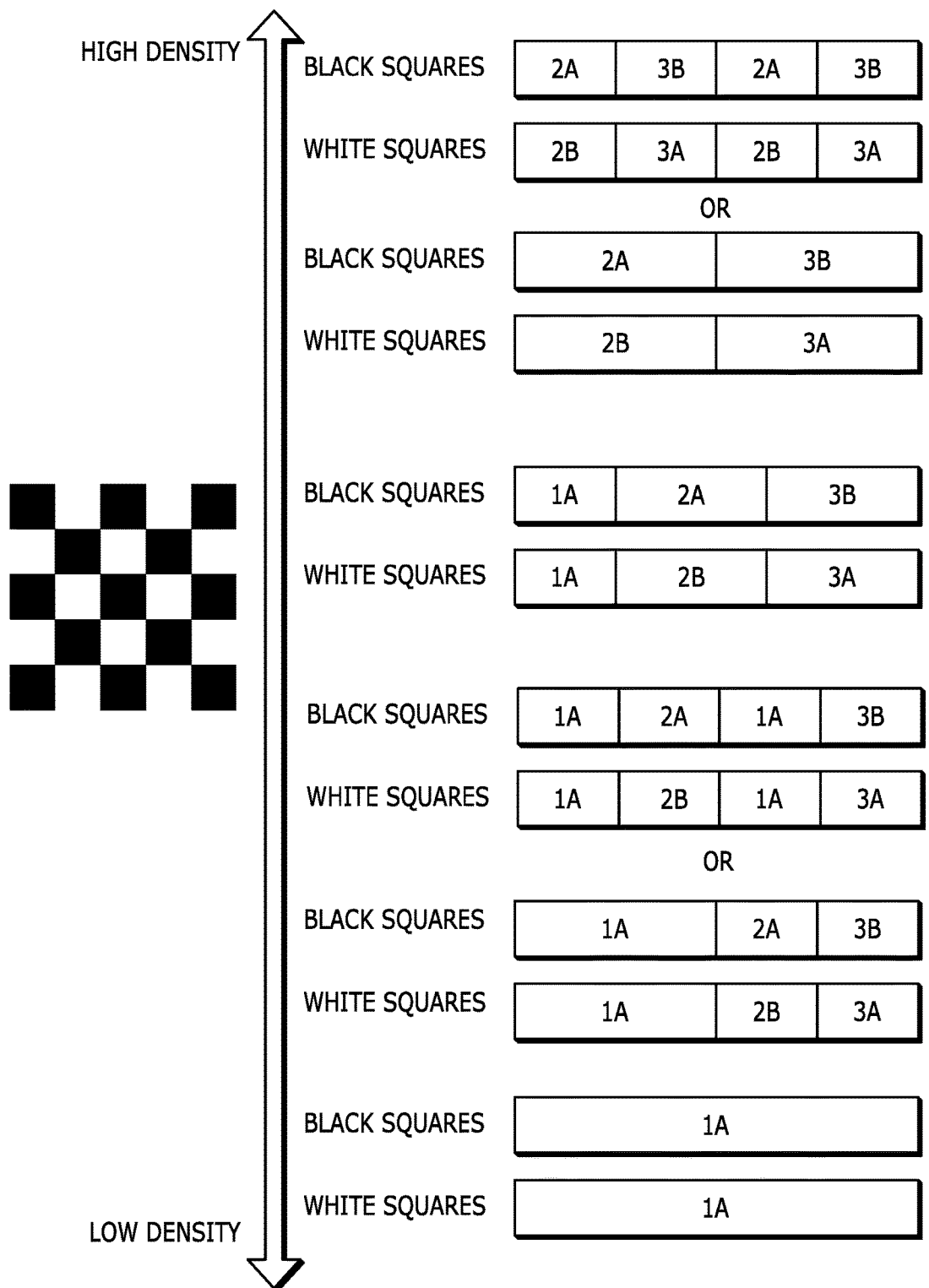
FIG. 4 is an illustration of how a read cycle for an RFID reader may be adapted based on RFID tag density within the venue of FIG. 1.

FIG. 4 is an illustration of how a read cycle for an RFID reader 31 may be adapted based on RFID tag density within the venue 10 of FIG. 1. It should be appreciated that the length of the various segments are generally indicative of the length of a dwell time the RFID reader spends in the indicated Session/State. As described herein, a centralized controller 16 analyzes the position data associated with each of the RFID tags 12 within the RF footprint of the detector stations 30. Based on the number of RFID tags 12 within the RF footprint of the RFID reader 31, the centralized controller 16 may determine and/or adjust a read cycle to be executed by the RFID reader 31. More particularly, FIG. 4 illustrates how the centralized controller 16 adjusts the read cycle based on RFID tag density. It should be appreciated that although FIG. 4 references the common standard described above, other standards may be implemented in accordance with the illustrated techniques.

Generally, the centralized controller 16 divides the plurality of detector stations 30 into an alternating pattern (such as the illustrated "checkerboard" pattern). As illustrated, the alternating pattern is formed by an alternating arrangement of "white squares" and "black squares." However, as illustrated, when the controller configures the RFID positioning network 14 to execute a mode of operation adapted for low densities of RFID tags 12 (such as Session/State 1A), the centralized controller 16 may configure both the "white squares" and the "black squares" to implement the same settings.

In the scenario having the lowest-density of RFID tags 12, the centralized controller may configure the read cycle for every detector station 30 to be solely in Session/State 1A (i.e., the dwell time for the high density setting is zero). It should be appreciated that due to the fact that RFID tags 12 reset to State A upon losing RF power, configuring every detector station 30 to operate solely in Session/State 1B would cause the RFID positioning system 14 to no longer track RFID tags 12 that lose RF power. Thus, it may be preferred to utilize Session/State 1A instead of Session/State 1B when configuring the detector stations 30 in low RFID tag density environments. In some embodiments, the centralized controller 16 may even decrease the Session 1 wait time to further increase the accuracy at which the RFID tags 12 are tracked.

As the venue 10 or portions of the venue 10 becomes more populated with RFID tags 12, the centralized controller 16 begins increasing the dwell time for the high-density setting and decreasing the dwell time for the low-density setting. In some embodiments, when implementing the high-density setting, the centralized controller 16 divides the high-density dwell time into a dwell time for Session 2 and a dwell time for Session 3. In other embodiments, the centralized controller 16 does not divide the high-density dwell time, but instead causes the detector stations 30 to simultaneously configure some of the RFID antenna elements 34 to operate in Session 2 and others of the RFID antenna elements 34 to operate in Session 3. For example, if the beams formed by the RFID antenna elements 34 are about equally spaced, the centralized controller 16 may cause the detector station 30 to rotationally alternate the RFID antenna elements 34 between Session 2 and Session 3.

Similarly, in some embodiments, the centralized controller 16 may divide the low-density dwell time to interleave the low-density and the high-density dwell times. For example, as illustrated, half of the low-density dwell may occur prior to the Session 2 dwell time, followed by the remaining half of the low-density dwell time prior to the Session 3 dwell time.

In the illustrated scenarios, the centralized controller 16 causes the plurality of detector stations 30 to operate in an alternating pattern of detector stations 30 in State A and detector stations 30 in State B. Thus, stationary RFID tags 12 are typically read up to a single time in Session 2 and/or Session 3 and do not continue to respond to Session 2 or Session 3 queries. Therefore, the detector stations 30 are more likely to be able to process all responses to a query. It should be appreciated, that the detector stations 30 that operate in Session/State 2A are configured to operate in Session/State 3B, and the detector stations 30 that operate in Session/State 2B are configured to operate in Session/State 3A. Again, as RFID tags 12 reset to State A upon losing RF power, this arrangement ensures that no matter the location within the RFID positioning network the RFID tag 12 loses RF power, the RFID tag 12 will respond to a query once RF power is restored.

In very high-density environments, the centralized controller 16 may configure some detector stations 30 entirely in the high-density setting (i.e., the low-density dwell time is zero). In some implementations, the centralized controller 16 may decrease the duration of the read cycle, thereby causing the detector stations 30 to cycle between Session 2 and Session 3 more frequently.

It should be appreciated that, in some embodiments, the centralized controller 16 does not uniformly set the dwell times for all detector stations 30. In these embodiments, detector stations 30 covering more densely tagged areas may be set to higher-density settings, whereas detector stations 30 covering less densely tagged areas may be set to lower-density settings. Additionally or alternatively, the centralized controller 16 may establish a gradient of dwell times between denser and sparser areas of the venue. In addition to analyzing the count of RFID tags 12 within the RF footprint for the detector station 30, the centralized controller 16 may also analyze the count of RFID tags 12 within the RF footprint of adjacent or otherwise nearby detector stations to set the dwell times for a particular detector station 30.

By accounting for the fact that the distribution of RFID tags 12 is typically not uniform throughout a venue 10, the read rate across the venue 10 may be adapted to an optimum value that enables more RFID tags 12 to be read a higher number of times. Said another way, the non-uniformity of read cycles across detector stations 30 enables the RFID positioning system 14 to automatically adapt to different densities of RFID tags 12. As these techniques are self-adjusting that do not require human intervention, if the RFID tag environment changes for any reason (updated store layout, new departments tagged, etc.), the RFID positioning system 14 may automatically adjust its settings to ensure that more RFID tags 12 are read a higher number of times.

Figure 5:
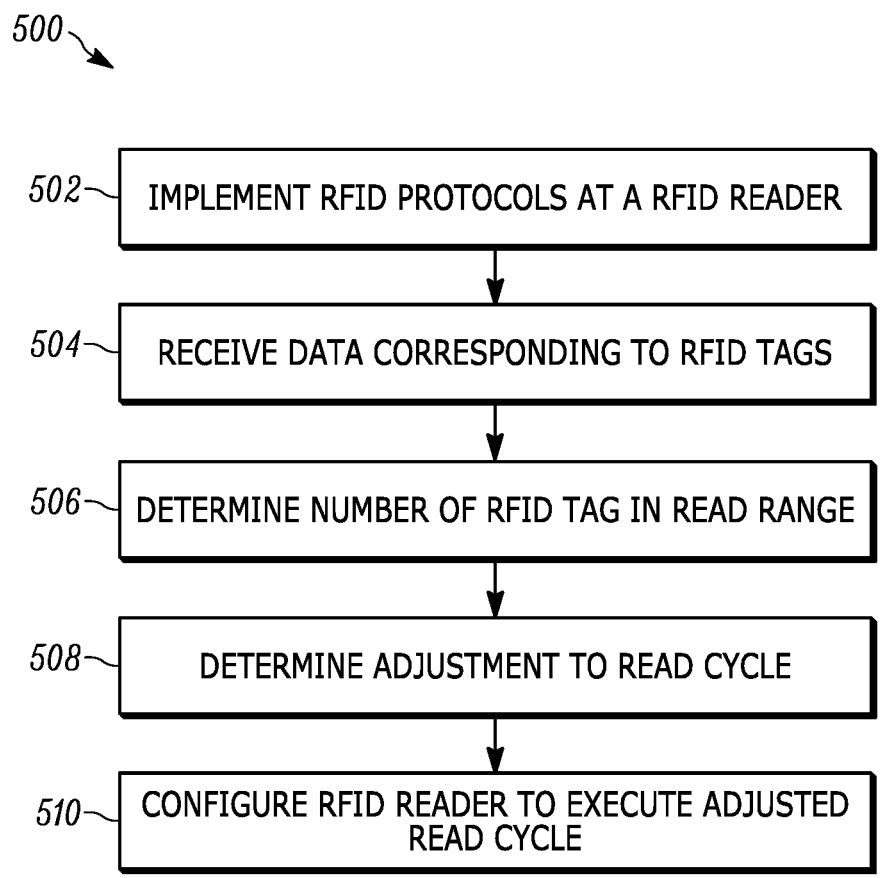
FIG. 5 is a flow chart of a method for adapting a read cycle for an RFID reader, in accordance with an example embodiment.

FIG. 5 is a flow chart of a method 500 for adapting a read cycle for an RFID reader 31, in accordance with an example embodiment. As described herein, the method 500 may be performed by a centralized controller 16 of a venue 10. The method 500 may begin at block 502 when the centralized controller 16 causes the RFID reader 31 to implement one or more RFID protocols. In some embodiments, the functionality to support the RFID protocols is built into the RFID module 32 of each detector station 30. In other embodiments, the centralized controller 16 pushes a software update to the detector stations 30 to enable the RFID module 32 to support the RFID protocols. In either case, the centralized controller 16 transmits an instruction to a detector station 30 to cause the RFID reader 31 to implement an RFID protocol. In some embodiments, the instruction is included in a message that defines a read cycle to be executed by the RFID reader 31.

At block 504, the centralized controller 16 receives data from the RFID reader 31 located at the venue 10. To this end, the RFID reader 31 may broadcast a query in accordance with one or more of the implemented RFID protocols. In response, the RFID reader 31 may detect a response from RFID tags 12. Accordingly, in some embodiments, the data received by the centralized controller 16 includes a count and/or a list of RFID tags 12 that responded to the query by the RFID reader 31. Thus, in these embodiments, the data received by the centralized controller 16 may not include position data.

Additionally or alternatively, the RFID reader 31 and/or the detector station 30 may communicate with other RFID readers 31 and/or detector stations 30 to determine a position of each RFID tag 12 at the venue 10 based on known positioning techniques. In these embodiments, the detector stations 30 may communicate to the centralized controller 16 the determined position of the RFID tags 12. In other embodiments, the detector stations 30 communicate the raw data sensed by the RFID reader 31 to the centralized controller 16. In these embodiments, the centralized controller 16 analyzes the raw data to determine the position for each RFID tag 12. Accordingly, the data received by the centralized controller 16 may include the determined position of each RFID tag 12 and/or the raw sensor data sensed by the RFID reader 31.

In some embodiments, the centralized controller 16 then updates the records in the RFID tag database 56 to include an indication of the position of the RFID tags 12. The position may be based on a coordinate system specific to the venue 10 (e.g., the south west corner is coordinate {0,0}). The centralized controller 16 may also include a time-stamp that indicates when RFID tags 12 were at their determined position. The centralized controller 16 may also update the record at the RFID tag database 56 to indicate one or more RFID readers 31 that detected the response transmitted by each RFID tag 12. Additionally, the centralized controller 16 may update records for detector stations 30 and/or RFID readers 31 at the RFID tag database 56 to indicate a list of RFID tags 12 within read range of the RFID reader 31. In some embodiments, the list may include RFID tags 12 that did not respond to a query transmitted by the RFID reader 31, but was nonetheless determined to be within read range of the RFID reader 31 based on the determined position data (such as when adjacent RFID reader 31 detects the response).

At block 506, the centralized controller 16 may determine, based on the data corresponding to the RFID tags 12, a number of RFID tags 12 within read range (i.e., within the RF footprint) of the RFID reader 31. In some embodiments, the centralized controller 16 may determine the count by receiving an indication of the count from the RFID reader 31. Additionally or alternatively, the centralized controller 16 may determine the count by determining the number of unique RFID tags 12 included within the list of RFID tags 12 included in the record for the detector station 30 and/or the RFID reader 31 at the RFID tag database 56.

As described herein, in some scenarios, the determined count may be artificially low, such as when there are more RFID tags 12 within read range of the RFID reader 31 than what the RFID reader 31 may process during a read cycle. Thus, the centralized controller 16 may implement one or more techniques to verify the accuracy of the count. For example, the centralized controller 16 may cause an RFID reader 31 to execute an inventory cycle by increasing the dwell time for the high-density setting to a high enough value (e.g., at least twice the dwell times from a prior read cycle) such that the RFID reader 31 has sufficient time to process the response from each RFID tag 12. In some scenarios, the centralized controller 16 analyzes a count of unique RFID tags 12 from a prior inventory cycle to determine the dwell time for the inventory cycle. To this end, the centralized controller 16 may multiply the previous count (plus, in some scenarios, a buffer value to account for potential additional RFID tags) by an estimated time to process each response to determine the dwell times.

As another example, the centralized controller 16 may cause an RFID reader 31 to execute a capacity check for the low-density setting and/or the high-density setting by increasing the dwell time for the low-density setting and/or the high density setting to determine whether the count increases more than a threshold margin. To this end, if the number of unique RFID tags 12 detected in the capacity check cycle exceeds the number of RFID tags 12 detected in a prior read cycle by the threshold margin, it may be indicative that the RFID reader 31 was hitting an artificial limit when counting the RFID tags 12. Thus, the count determined by the centralized controller 16 during the capacity check cycle may be more accurate than the count the centralized controller 16 determined for the previous read cycle. In some scenarios, the increased dwell time is less than twice the dwell time for the prior read cycle. Further, in embodiments where the centralized controller 16 causes an RFID reader 31 to execute a capacity check for one of the high-density or low-density settings and the count did not change more than a threshold amount, the centralized controller 16 may cause the RFID reader 31 to execute a secondary capacity check on the other one of the high-density or low-density settings.

As still another example, the centralized controller 16 may compare the RFID tag counts for adjacent RFID readers 31. To this end, if the count for a particular RFID reader 31 is less than the count for an adjacent RFID reader 31 by a threshold margin, then the RFID reader 31 with the lower count may be hitting an artificial limit. Accordingly, the centralized controller 16 may cause the particular RFID reader 31 with the lower count to execute a capacity check cycle and/or utilize the count from the adjacent RFID reader 31 as the count for the particular RFID reader 31.

At step 508, based on the count, the centralized controller 16 may determine an adjustment to the read cycle for the RFID reader 31. More particularly, the centralized controller 16 may determine an adjustment to a read cycle for a particular RFID reader 31 based on the count during a read cycle, an inventory cycle, a capacity check (or secondary capacity check) cycle, and/or a count for an adjacent RFID reader 31. To this end, if the count of unique RFID tags 12 is increasing and/or is above a threshold value, the centralized controller 16 may increase the dwell time for a high-density setting and/or decrease the dwell time for a low-density setting for the RFID reader 31. Similarly, if the count of unique RFID tags is decreasing and/or is below a threshold value, the centralized controller 16 may decrease the dwell time for a high-density setting and/or increase the dwell time for a low-density setting for the RFID reader 31.

At step 510, the centralized controller 16 configures the RFID reader 31 to execute the adjusted read cycle. To this end, the centralized controller 16 may transmit an instruction to the detector station 30 that indicates the adjusted dwell times for both the high-density and the low-density settings. Accordingly, the detector station 30 may update the version of the read cycle maintained at the RFID module 32. In some embodiments, the centralized controller 16 may also update the record for the detector station 30 and/or the RFID reader 31 at the RFID tag database 56 to indicate the adjusted read cycle.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for adapting a network of RFID readers, the system comprising:
   a plurality of radio frequency identification (RFID) readers disposed throughout a venue, wherein each of the RFID readers:
      executes a read cycle that is defined by a dwell time for a high RFID tag density setting and a dwell time for a low RFID tag density setting; and
      implements one or more of the following RFID protocols, wherein each protocol (i) is associated with a first state and a second state, (ii) when an RFID tag responds to a query generated by the RFID reader, the RFID tag alternates between the first and second states, and (iii) RFID tags respond when a state of the queried RFID tag matches a state of the RFID reader:
         a first protocol where queried RFID tags in the matching state change to the other state for a duration of a wait period and return to the matching state upon expiration of the wait period; and
         a second protocol and a third protocol wherein RFID tags in the matching state change to the other state until (1) queried by an RFID reader in the other state, or (2) when the matching state is the second state, the queried RFID tag loses RF power for a threshold duration;
   a controller operatively connected to the plurality of RFID readers, the controller comprising at least one processor configured:
      to receive, from the plurality of RFID readers, data corresponding to a plurality of RFID tags;
      to determine, based on the data corresponding to the plurality of RFID tags, a number of RFID tags within a read range of each RFID reader;
      to determine, based on the number of RFID tags within the read range of each RFID reader, an adjustment to the read cycle for the RFID reader; and
      to configure each RFID reader to execute the adjusted read cycle.

2. The system of claim 1, wherein the low RFID tag density setting implements the first protocol.

3. The system of claim 1, wherein the high RFID tag density setting causes the plurality of RFID readers to implement an alternating pattern formed of RFID readers implementing the second protocol and RFID readers implementing the third protocol.

4. The system of claim 1, wherein to determine the number of RFID tags within the read range of a particular RFID reader, the at least one processor of the controller is configured:
   to execute an inventory cycle by setting the dwell times for the high RFID tag density setting and the low RFID tag density setting to a first predetermined value such that each RFID tag implementing the respective setting is read during the respective dwell time; and
   to count the number of unique tags read by the particular RFID reader during the inventory cycle.

5. The system of claim 4, wherein to set the dwell times to the first predetermined value, the at least one processor of the controller is configured:
   to determine a number of unique tags counted during a prior inventory cycle.

6. The system of claim 4, wherein the first predetermined value is at least twice the duration of the dwell time for the high RFID tag density setting or the low RFID tag density setting during a read cycle.

7. The system of claim 1, wherein to determine an adjustment to the read cycle for a particular RFID reader, the at least one processor of the controller is configured:
   to execute a capacity check cycle by increasing the dwell time for the low RFID tag density setting to a second predetermined value; and
   to compare a number of unique tags read during the capacity check cycle to a number of unique tags read during a prior read cycle.

8. The system of claim 7, wherein to determine the adjustment to the read cycle for the particular RFID reader, the at least one processor of the controller is configured:
   to determine that the number of unique tags read during the capacity check cycle exceeds the number of unique tags read during a prior read cycle by a threshold margin; and
   to adjust the read cycle for the particular RFID reader by increasing the dwell time for the low RFID tag density setting.

9. The system of claim 7, wherein to determine the adjustment to the read cycle for the particular RFID reader, the at least one processor of the controller is configured:
   to determine that the number of unique tags read during the capacity check cycle is within a threshold range of the number of unique tags read during a prior read cycle by a threshold margin;
   to execute a secondary capacity check cycle by increasing the dwell time for the high RFID tag density setting;
   to determine that the number of unique tags read during the secondary capacity check exceeds the number of unique tags read during a prior read cycle by a threshold margin; and
   to adjust the read cycle for the particular RFID reader by increasing the dwell time for the high RFID tag density setting.

10. The system of claim 7, wherein the second predetermined value is less than twice the duration of the dwell time for the low RFID tag density setting during the prior read cycle.

11. The system of claim 1, wherein to determine an adjustment to the read cycle for a particular RFID reader, the at least one processor of the controller is configured:
   to determine that a number of unique tags read by the particular RFID reader during a read cycle is less than a number of unique tags read by an adjacent RFID reader during a read cycle by a threshold margin; and
   to adjust the read cycle for the particular RFID reader by increasing the dwell time for the low RFID tag density setting.

12. The system of claim 1, wherein to determine an adjustment to the read cycle for a particular RFID reader, the at least one processor of the controller is configured:
   to determine that the number of RFID tags within the read range of the particular RFID reader exceeds a first threshold value
   to adjust the read cycle for the particular RFID reader by performing at least one of (i) increasing the dwell time for the high RFID tag density setting or (ii) decreasing the dwell time for the low RFID tag density setting.

13. The system of claim 1, wherein to determine an adjustment to the read cycle for a particular RFID reader, the at least one processor of the controller is configured:
to determine that the number of RFID tags within the read range of the particular RFID reader is less than a second threshold value
to adjust the read cycle for the particular RFID reader by performing at least one of (i) increasing the dwell time for the low RFID tag density setting or (ii) decreasing the dwell time for the high RFID tag density setting.

14. A method for adapting a read cycle that is defined by a dwell time for a high RFID tag density setting and a dwell time for a low RFID tag density setting of an RFID reader, the method comprising:
implementing, at the RFID reader, one or more of the following RFID protocols, wherein each protocol (i) is associated with a first state and a second state, (ii) when an RFID tag responds to a query generated by the RFID reader, the RFID tag alternates between the first and second states, and (iii) RFID tags respond when a state of the queried RFID tag matches a state of the RFID reader:
a first protocol where queried RFID tags in the matching state change to the other state for a duration of a wait period and return to the matching state upon expiration of the wait period, and
a second protocol and a third protocol wherein RFID tags in the matching state change to the other state until (1) queried by an RFID reader in the other state, or (2) when the matching state is the second state, the queried RFID tag loses RF power for a threshold duration;
receiving, from the RFID reader, data corresponding to a plurality of RFID tags;
determining, based on the data corresponding to the plurality of RFID tags, a number of RFID tags within a read range of the RFID reader;
determining, based on the number of RFID tags within the read range of the RFID reader, an adjustment to the read cycle for the RFID reader; and
configuring the RFID reader to execute the adjusted read cycle.

15. The method of claim 14, wherein the low RFID tag density setting implements the first protocol.

16. The method of claim 14, wherein the high RFID tag density setting implements the second protocol and/or the third protocol.

17. The method of claim 14, wherein determining the number of RFID tags within the read range of a particular RFID reader comprises:
executing an inventory cycle by setting the dwell times for the high RFID tag density setting and the low RFID tag density setting to a first predetermined value such that each RFID tag implementing the respective setting is read during the respective dwell time; and
counting the number of unique tags read by the particular RFID reader during the inventory cycle.

18. The method of claim 17, wherein setting the dwell times to the first predetermined value comprises:
determining a number of unique tags counted during a prior inventory cycle.

19. The method of claim 17, wherein the first predetermined value is at least twice the duration of the dwell time for the high RFID tag density setting or the low RFID tag density setting during a read cycle.

20. The method of claim 14, wherein determining the adjustment to the read cycle comprises:
executing a capacity check cycle by setting the dwell time for the low RFID tag density setting to a second predetermined value; and
comparing a number of unique tags read during the capacity check cycle to a number of unique tags read during a prior read cycle.

21. The method of claim 20, wherein determining the adjustment to the read cycle for the particular RFID reader comprises:
determining that the number of unique tags read during the capacity check cycle exceeds the number of unique tags read during a prior read cycle by a threshold margin; and
adjusting the read cycle for the particular RFID reader by increasing the dwell time for the low RFID tag density setting.

22. The method of claim 20, wherein determining the adjustment to the read cycle for the particular RFID reader comprises:
determining that the number of unique tags read during the capacity check cycle is within a threshold range of the number of unique tags read during a prior read cycle by a threshold margin;
executing a secondary capacity check cycle by increasing the dwell time for the high RFID tag density setting;
determining that the number of unique tags read during the secondary capacity check exceeds the number of unique tags read during a prior read cycle by a threshold margin; and
adjusting the read cycle for the particular RFID reader by increasing the dwell time for the high RFID tag density setting.

23. The method of claim 20, wherein the second predetermined value is less than twice the duration of the dwell time for the low RFID tag density setting during the prior read cycle.

24. The method of claim 14, wherein determining the adjustment to the read cycle comprises:
determining that a number of unique tags read by the RFID reader during a read cycle is less than a number of unique tags read by an adjacent RFID reader during a read cycle by a threshold margin; and
adjusting the read cycle for the RFID reader by increasing the dwell time for the low RFID tag density setting.

25. The method of claim 14, wherein determining the adjustment to the read cycle comprises:
determining that the number of RFID tags within the read range of the RFID reader exceeds a first threshold value; and
adjusting the read cycle for the RFID reader by at least one of (i) increasing the dwell time for the high RFID tag density setting or (ii) decreasing the dwell time for the low RFID tag density setting.

26. The method of claim 14, wherein determining the adjustment to the read cycle comprises:
determining that the number of RFID tags within the read range of the RFID reader is less than a second threshold value; and
adjusting the read cycle for the RFID reader by at least one of (i) increasing the dwell time for the low RFID tag density setting or (ii) decreasing the dwell time for the high RFID tag density setting.

* * * * *